Sept. 29, 1931.   J. M. KAUFMAN   1,824,900
CORNER JOINT
Filed April 27, 1929
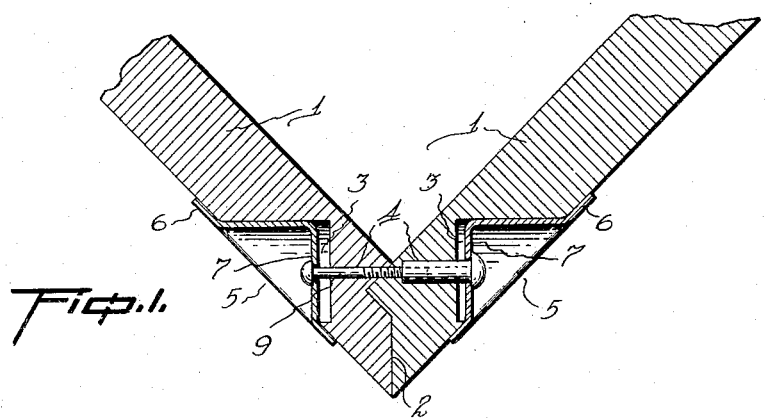
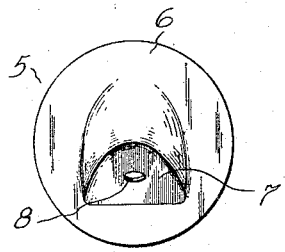   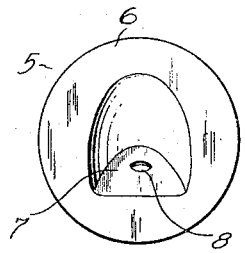
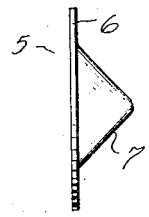
INVENTOR
*Jacob M. Kaufman*
BY
ATTORNEYS Patented Sept. 29, 1931

1,824,900

UNITED STATES PATENT OFFICE

JACOB M. KAUFMAN, OF DETROIT, MICHIGAN, ASSIGNOR TO AMERICAN SHOW CASE & MFG. CO., OF DETROIT, MICHIGAN, A CORPORATION OF MICHIGAN

CORNER JOINT

Application filed April 27, 1929. Serial No. 358,505.

The present invention pertains to a novel corner joint of the type employed to permanently or temporarily join corner members together.

The primary object of the present invention is to devise a corner joint capable of securing the corners of a so-called bargain rim which comprises a frame to be applied upon tables in stores during sales for the purpose of providing a barricade around the edges of the table to prevent goods which are piled upon the table from falling off. The ordinary manner of joining such as with dove tail joints or ordinary tenoned wood bolts or dowels has not proven successful or satisfactory and is not at all pleasing to the eye. The joint must necessarily be capable of withstanding considerable stress as well as pleasing in appearance and with this problem in view the present joint has been devised.

Another object of the present invention is to devise a corner joint which will connect abutting members, securely together in such a manner that they will remain secured together subject to anything less than actual destructive force yet which may be separated in a manner of the highest simplicity if the separation is desired. The device is such that it does not in the least detract from the strength of the members being joined and is of pleasing appearance and suitable for use in cases where an attractive exterior is necessary.

With these and other objects in view my invention is fully set forth and more particularly pointed out in the appended claims, reference being had to the accompanying drawings, in which Figure 1 is a cross sectional view through a pair of members joined in accordance with the present invention;

Figure 2 is a rear side view of one of the members forming part of my invention;

Figure 3 is a front side view corresponding with Figure 2, and

Figure 4 is a side elevation corresponding with Figures 2 and 3.

Like characters are employed to indicate the corresponding parts throughout.

The numeral 1 indicates a pair of members having their abutting ends mitered in any suitable manner as at 2, it being the purpose of this invention to tightly secure these abutting ends of the members together. To accomplish the present invention the members 1 are drilled to form bores 3 for the purpose of receiving members presently to be described in detail, the members 1 being also provided with smaller bores 4.

The purpose of the bores 3 is to accommodate plates 5 which are formed from metal discs 6, stamped to form a face 7 extending angularly from the disc 6, the face 7 being provided with a perforation 8. The angularly extending face 7 is formed at an angle of approximately 45° to the face of the disc 6 for the purpose of joining members extending at right angles to each other as illustrated and this portion is inserted in the bore 3 in each of the members 1 so that the faces 7 lie parallel to each other with the rear face of each disc 6 engaging the outside face of each of the members 1 around the periphery of the bores 3.

A telescopical screw 9 is provided and is passed through the perforations 8 and through the bores 4 and when tightened the screw draws the two faces 7 together which in turn cause the discs 6 to draw the members 1 together. When the screw 9 has been tightened the members 1 are tightly held together in a manner which provides a large bearing surface between the discs and the members and thereby considerably increases the strength of the joint over the ordinary manner of joining the ends of members together. It will be noted that this manner of supporting the screw 9 permits it to be inserted in a manner whereby it is substantially at right angles to a line which bisects the angle at which the members 1 are joined and is tightened without the heads coming directly in contact with the members 1.

Although a specific embodiment of my invention has been illustrated and described it is to be understood that various alterations may be made in the details of construction without departing from the spirit of the invention as depicted in the following claims.

What I claim as my invention is:

1. A device of the character described comprising abutting members arranged at substantially right angles to each other and having their meeting ends mitered, sockets formed in said abutting members adjacent the ends thereof, plates engaging said members around said sockets, indents formed in said plates and received in said sockets in a manner whereby the bottom of said indent lies substantially parallel to a line bisecting the meeting angle of said members, and means passing through said members and received in said indents for drawing said plates towards each other to secure said members together.

2. A device of the character described comprising abutting members arranged at substantially right angles to each other and having their meeting ends mitered, sockets formed in said abutting members adjacent the ends thereof, plates engaging said members around said sockets, indents formed in said plates and received in said sockets in a manner whereby the bottom of said indent lies substantially parallel to a line bisecting the meeting angle of said members, and a telescopic screw having its opposite ends engaging opposite indents in a manner to draw said plates together and hold said abutting members in their relative positions.

3. The combination with members arranged at an angle to each other with their ends abutting, of sockets formed in said members adjacent the abutting ends thereof, plates surrounding said sockets, indents formed in said plates to project into said sockets in a manner whereby the bottom of said indent lies substantially parallel to the bisector of the meeting angle of said members, and means for connecting said indents together in a manner to exert pressure on said plates on a line at right angles to the bisector of the meeting angle of said members.

4. The combination with members arranged at an angle to each other with their ends abutting, of sockets formed in said members adjacent the abutting ends thereof, plates surrounding said sockets, indents formed in said plates to project into said sockets in a manner whereby the bottom of said indents lies substantially parallel to the bisector of the meeting angle of said members, and a telescopic screw having its opposite ends received in opposite indents in a manner to draw them together by exerting pressure on a line substantially at right angles to the bisector of the meeting angles of said members.

In testimony whereof I affix my signature.

JACOB M. KAUFMAN.